(12) United States Patent
Senoo (10) Patent No.: US 7,536,502 B2
(45) Date of Patent: May 19, 2009

(54) CONTROLLER DEVICE TO BE CONNECTED TO IEEE 1394 SERIAL BUS

(75) Inventor: Jyunya Senoo, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 272 days.

(21) Appl. No.: 11/187,016

(22) Filed: Jul. 22, 2005

(65) Prior Publication Data

US 2006/0020750 A1    Jan. 26, 2006

(30) Foreign Application Priority Data

Jul. 23, 2004 (JP) ............................. 2004-216442
Jul. 23, 2004 (JP) ............................. 2004-216445

(51) Int. Cl.
*G06F 12/14* (2006.01)

(52) U.S. Cl. ..................................... 711/112

(58) Field of Classification Search ................ 711/112
See application file for complete search history.

(56) References Cited

U.S. PATENT DOCUMENTS

| 6,560,613 | B1 * | 5/2003 | Gylfason et al. ............ 707/200 |
| 6,636,953 | B2 * | 10/2003 | Yuasa et al. .................. 711/161 |
| 7,392,335 | B2 * | 6/2008 | Chan et al. ................... 710/200 |
| 2003/0088745 | A1 | 5/2003 | Okada | |
| 2003/0103288 | A1 | 6/2003 | Suzuki | |

FOREIGN PATENT DOCUMENTS

| EP | 1 061 520 A2 | 12/2000 |
| JP | 2000-357386 A | 12/2000 |
| JP | 2001-331372 A | 11/2001 |
| JP | 2002-176578 A | 6/2002 |
| JP | 2002-262148 A | 9/2002 |
| JP | 2002-314924 A | 10/2002 |
| JP | 2003-30052 A | 1/2003 |
| JP | 2003-140835 A | 5/2003 |
| JP | 2003-167681 A | 6/2003 |
| JP | 2003-256283 A | 9/2003 |
| JP | 2003-289490 A | 10/2003 |
| JP | 2004-79005 A | 3/2004 |

OTHER PUBLICATIONS

Japanese Office Action for patent application No. 2004-216442 dated Feb. 26, 2007 with English translation (Four (4) pages).
Japanese Office Action for patent application No. 2004-216445 dated Feb. 26, 2007 with English translation (Four (4) pages).

* cited by examiner

*Primary Examiner*—Hyung S Sough
*Assistant Examiner*—Hamdy S Ahmed
(74) *Attorney, Agent, or Firm*—Crowell & Moring LLP (57) ABSTRACT

When the user instructs deletion of all program files using a remote control, a microprocessor of a set-top box repeats transmission of a deletion command with respect to all program files stored in a hard disk recorder to the hard disk recorder and deletes all program files excluding the program file subjected to lock processing among all program files stored in a hard disk recorder. Thus, the set-top box can delete all of unnecessary program files in the hard disk recorder in a short time period.

18 Claims, 6 Drawing Sheets

CONTROLLER DEVICE TO BE CONNECTED TO IEEE 1394 SERIAL BUS

BACKGROUND OF THE INVENTION

1. Field of the Invention

The present invention relates to a controller device such as a set-top box and a digital television receiving set, which can be connected to a hard disk recorder for IEEE 1394 (so-called AVHDD) via an IEEE 1394 serial bus.

2. Description of the Related Art

In recent years, hard disk recorders to be connected to a controller device such as a set-top box and a digital television receiving set by using an IEEE 1394 serial bus cable (so-called AVHDD) have been increasingly used. When using this kind of hard disk recorders, the user generally adopts a method of accumulating program files until remaining storage capacity of a hard disk in the hard disk recorder has been run out and then selecting and deleting program files to be deleted one by one from the side of the controller device, or selecting program files to be deleted one by one from the side of the controller device and deleting the selected program files all together.

According to the above-mentioned deleting method, there occurs no problem when the number of the program files to be deleted is small. However, when the number of the program files to be deleted exceeds 100, it may take one hour or more only to select and delete the unnecessary program files. In many cases, when remaining storage capacity of the hard disk in the hard disk recorder has been run out, almost all of recorded program files are unnecessary for the user.

Furthermore, even when the user intends to delete all program files in the hard disk recorder by using a format command, since the format command issued from the controller device to the hard disk recorder is effective only between devices made by the same manufacturer, all program files in the hard disk recorder cannot be deleted all together by using a format command in the case where a manufacturer of the controller device is different from that of the hard disk recorder.

SUMMARY OF THE INVENTION

In order to solve the above-mentioned problem, the present invention intends to provide a controller device to be connected to the IEEE 1394 serial bus which can delete all of unnecessary program files in a hard disk recorder from the side of the controller device in a short time period and with simple operation even when a manufacturer of the controller device such as a set-top box is different from that of the hard disk recorder.

According to a first aspect of the present invention, we provide a controller device to be connected to a hard disk recorder capable of transmitting and receiving a control command for IEEE1394 through an IEEE1394 serial bus comprising: an operation means for issuing instructions for various operations to the controller device and the hard disk recorder including lock processing for preventing deletion of selected program file in the program files stored in the hard disk recorder and deletion processing of all program files stored in the hard disk recorder; an IEEE1394 interface for transmitting/receiving the control command for IEEE1394, its response signal and stream data to/from the hard disk recorder; and a microprocessor for controlling the processing of deleting all program files in the hard disk recorder.

When the user instructs the deletion processing of all program files using the operation means, the microprocessor repeats transmission of a deletion command with respect to all program files stored in the hard disk recorder to the hard disk recorder and deletes all program files excluding the program file subjected to the lock processing among all program files stored in the hard disk recorder.

According to the controller device of the first aspect of the present invention as described above, when the user merely performs the simple operation of instructing the deletion processing of all program files using the operation means, all unnecessary program files in a hard disk recorder can be deleted from the side of the controller device in a short time period and with simple operation.

According to a second aspect of the present invention, we provide a controller device to be connected to a hard disk recorder capable of transmitting and receiving a control command for IEEE1394 through an IEEE1394 serial bus comprising: an operation means for issuing instructions for various operations to the controller device and the hard disk recorder including lock processing for preventing deletion of selected program file in the program files stored in the hard disk recorder and deletion processing of all program files stored in the hard disk recorder; an IEEE1394 interface for transmitting/receiving the control command for IEEE1394, its response signal and stream data to/from the hard disk recorder; and a microprocessor for controlling the processing of deleting all program files in the hard disk recorder.

When the user instructs the deletion processing of all program files using the operation means, the microprocessor repeats transmission of a deletion command with respect to all program files excluding the program file in a locking state among the program files stored in the hard disk recorder.

According to a third aspect of the present invention, we provide a controller device to be connected to a hard disk recorder capable of transmitting and receiving a control command for IEEE1394 through an IEEE1394 serial bus comprising: an operation means for issuing instructions for various operations to the controller device and the hard disk recorder including lock processing for preventing deletion of selected program file in the program files stored in the hard disk recorder and deletion processing of all program files stored in the hard disk recorder; an IEEE1394 interface for transmitting/receiving the control command for IEEE1394, its response signal and stream data to/from the hard disk recorder; and a microprocessor for controlling the deletion processing of all program files in the hard disk recorder.

When the user instructs the processing of deleting all program files using the operation means, the microprocessor repeats transmission of a deletion command with respect to all program files stored in the hard disk recorder to the hard disk recorder, for the program file not deleted, transmits a lock release command with respect to the program file concerned to the hard disk recorder to release lock state of the program file and transmits the deletion command with respect to the program file again.

Accordingly, even when a manufacturer of the controller device is different from that of the hard disk recorder and thus a format command of the hard disk transmitted from the controller device to the hard disk recorder becomes invalid, the same effect can be obtained as in the case where an effective format command is transmitted from the controller device to the hard disk recorder.

According to a fourth aspect of the present invention, we provide a controller device to be connected to a hard disk recorder capable of transmitting and receiving a control command for IEEE1394 through an IEEE1394 serial bus comprising: an operation means for issuing instructions for various operations to the controller device and the hard disk recorder including lock processing for preventing deletion of selected program file in the program files stored in the hard disk recorder and deletion processing of all program files stored in the hard disk recorder; an IEEE1394 interface for transmitting/receiving the control command for IEEE1394, its response signal and stream data to/from the hard disk recorder; a control means for controlling the processing of deleting all program files in the hard disk recorder; a program total number acquisition means for finding the number of program files stored in the hard disk recorder on the basis of data received from the hard disk recorder through the IEEE1394 interface; a program total number counter for setting the total number of the program files found by the program total number acquisition means as an initial value; a decrement means for subtracting 1 from a value of the program total number counter; a specified program number storage means for storing a specified program number as a number of the program file to be deleted at the time among the program files stored in the hard disk recorder; and a determination means for determining whether or not the program file concerned is successfully deleted on the basis of a return code to the deletion command with respect to each program file. When the user instructs the deletion processing of all program files stored in the hard disk recorder using the operation means, the control means performs the deletion processing comprising: repeating transmission of the deletion command with respect to each program file to the hard disk recorder until the value of the program total number counter becomes 0 and performs determination by the determination means each transmission of the deletion command; subtracting 1 from the value of the program total number counter by the decrement means when the determination means determines that the program file concerned is successfully deleted; and adding 1 to the specified program number stored in the specified program number storage means to change the program file to be deleted and then subtracts 1 from the value of the program total number counter by the decrement means when the determination means determines that the program file concerned is not successfully deleted.

According to a fifth aspect of the present invention, we provide a controller device to be connected to a hard disk recorder capable of transmitting and receiving a control command for IEEE1394 through an IEEE1394 serial bus comprising: an operation means for issuing instructions for various operations to the controller device and the hard disk recorder including lock processing for preventing deletion of selected program file in the program files stored in the hard disk recorder and deletion processing of all program files stored in the hard disk recorder; an IEEE1394 interface for transmitting/receiving the control command for IEEE1394, its response signal and stream data to/from the hard disk recorder; a control means for controlling the processing of deleting all program files in the hard disk recorder; a program total number acquisition means or finding the number of program files stored in the hard disk recorder on the basis of data received from the hard disk recorder through the IEEE1394 interface; a program total number counter for setting the total number of the program files found by the program total number acquisition means as an initial value; a decrement means for subtracting 1 from a value of the program total number counter; and a determination means for determining whether or not the program file concerned is successfully deleted on the basis of a return code to the deletion command with respect to each program file stored in the hard disk recorder.

When the user instructs deletion of all program files stored in the hard disk recorder using the operation means, the control means performs the deletion processing comprising: repeating transmission of the deletion command with respect to each program file to the hard disk recorder until the value of the program total number counter becomes 0 and performs determination by the determination means each transmission of the deletion command; subtracting 1 from the value of the program total number counter by the decrement means when the determination means determines that the program file concerned is successfully deleted; and transmitting a lock release command with respect to the program file concerned to the hard disk recorder to release lock state of the program file without changing the value of the program total number counter and transmits the deletion command with respect to the program file again when the determination means determines that the program file concerned is not successfully deleted.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Preferred embodiments for carrying out the present invention will be described below referring to accompanying drawings. The present invention relates to a controller device connected to a hard disk recorder through an IEEE 1394 serial bus. The following embodiments describe examples in the case of applying the present invention to a set-top box. Note that the specific embodiments described are not intended to cover the entire scope of the present invention, and hence the present invention is not limited to only the specific embodiments.

Figure 1:
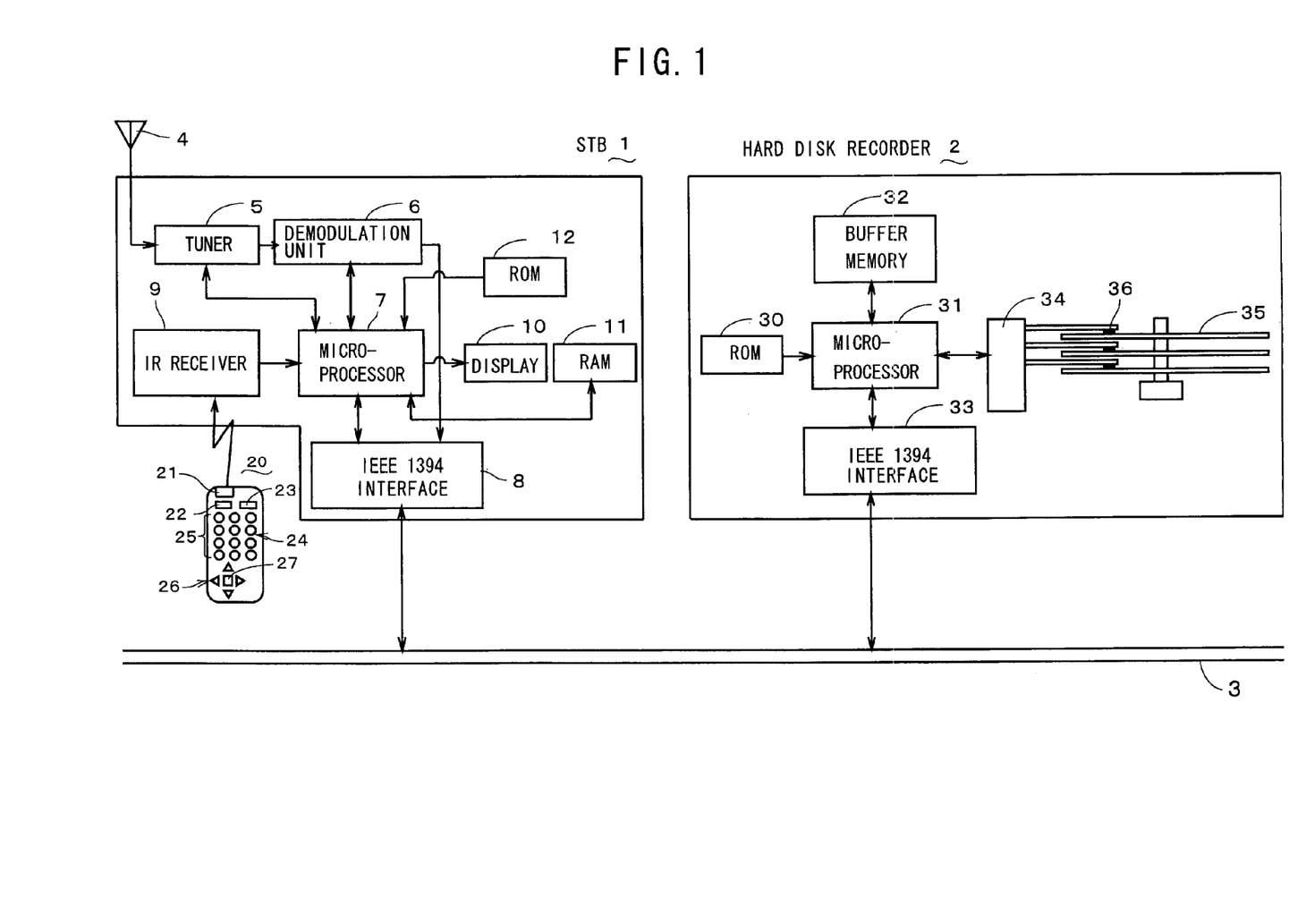
FIG. 1 is an electric block diagram of a set-top box (STB) according to a first embodiment of the present invention and a hard disk recorder connected to the STB.

FIG. 1 shows the electric block configuration of a set-top box according to a first embodiment and a hard disk recorder connected to the set-top box through an IEEE 1394 serial bus. This set-top box (hereinafter referred to as "STB") 1 outputs a broadcast signal of a channel selected by the user among broadcast signals received through an antenna 4. The hard disk recorder 2 is a so-called AVHDD-type hard disk recorder which can transmit and receive control commands for IEEE 1394.

The STB 1 is provided with a microprocessor 7 (control means, program total number acquisition means, decrement means, determination means in claims) for controlling the whole of the STB 1. A tuner 5, a demodulation unit 6, an IEEE 1394 interface 8 (hereinafter referred to as "interface"), an infrared signal reception unit (IR receiver) 9, display unit (display) 10, a RAM 11 and a ROM 12 are connected to the microprocessor 7.

The tuner 5 extracts a broadcast signal of a channel selected by the user among broadcast signals received by the antenna 4. The demodulation unit 6 demodulates the broadcast signal extracted by the tuner 5 according to a broadcast system. The interface 8 is an interface circuit for transmitting/receiving data to/from other devices on the IEEE 1394 serial bus 3 (hereinafter referred to as "bus") and transmits/receives data to/from the hard disk recorder 2 through the bus 3. The infrared signal reception unit 9 receives an instruction signal in the form of an infrared signal from a remote control 20, converts the instruction signal into a normal digital signal and transmits the converted digital signal to the microprocessor 7. The display unit 10 displays a list of program names of program files stored in the hard disk recorder 2, various kinds of messages and the like thereon. The RAM 11 (specified program number storage means) stores various data mentioned later, such as a program total number counter and specified program numbers therein. The ROM 12 stores various control programs therein.

The remote control 20 (operation means) has a key part 24 consisting of various keys and an infrared signal transmission unit 21. A power key 23, a numeric key 25, a cursor key 26, an enter key 27 and a menu key 22 for displaying various menus are arranged on the key part 24. The keys of the remote control 20 are used for issuing instructions for various operations to the STB 1 and the hard disk recorder 2 including deletion of all program files stored in the hard disk recorder 2 (hereinafter referred to as "whole deletion"), lock processing for preventing deletion of selected program file in the program files stored in the hard disk recorder 2 and lock release processing.

The hard disk recorder 2 has a microprocessor 31 for controlling the whole of the hard disk recorder 2, a ROM 30 for storing a control program for the microprocessor 31 therein and an IEEE 1394 interface 33 (hereinafter referred to as "interface") for receiving control commands and data such as stream data from the STB 1 and the like through the bus 3. The hard disk recorder 2 has a plurality of hard disks 35 as record mediums, a plurality of magnetic heads 36 for recording/reading data on/from these hard disks, a head drive unit 34 for driving the magnetic heads 36 and a buffer memory 32 for temporarily storing data to be recorded or data read out.

Figure 2:
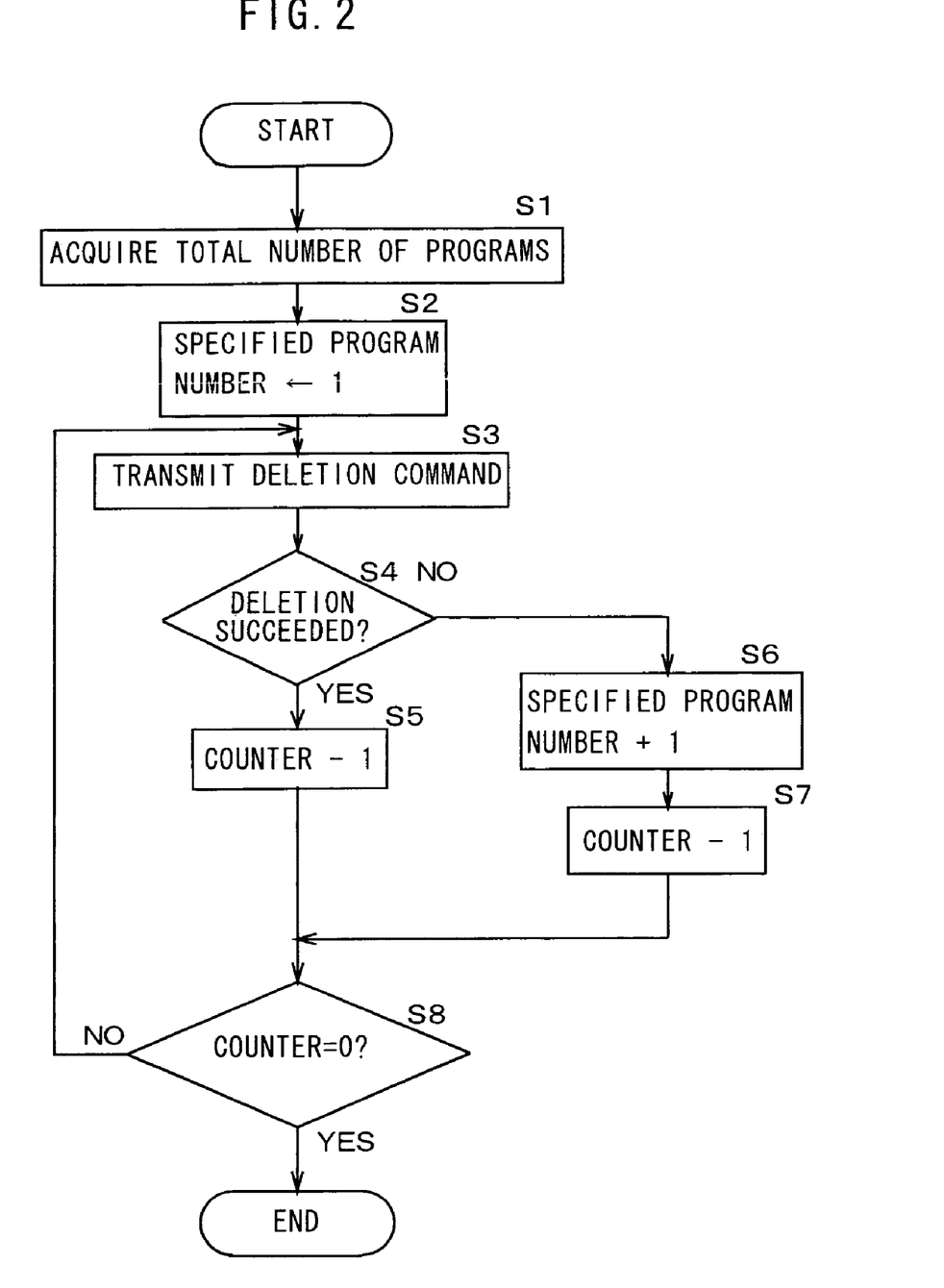
FIG. 2 is a flow chart showing processing in the STB in the case where an instruction for whole deletion is issued.
Figure 3:
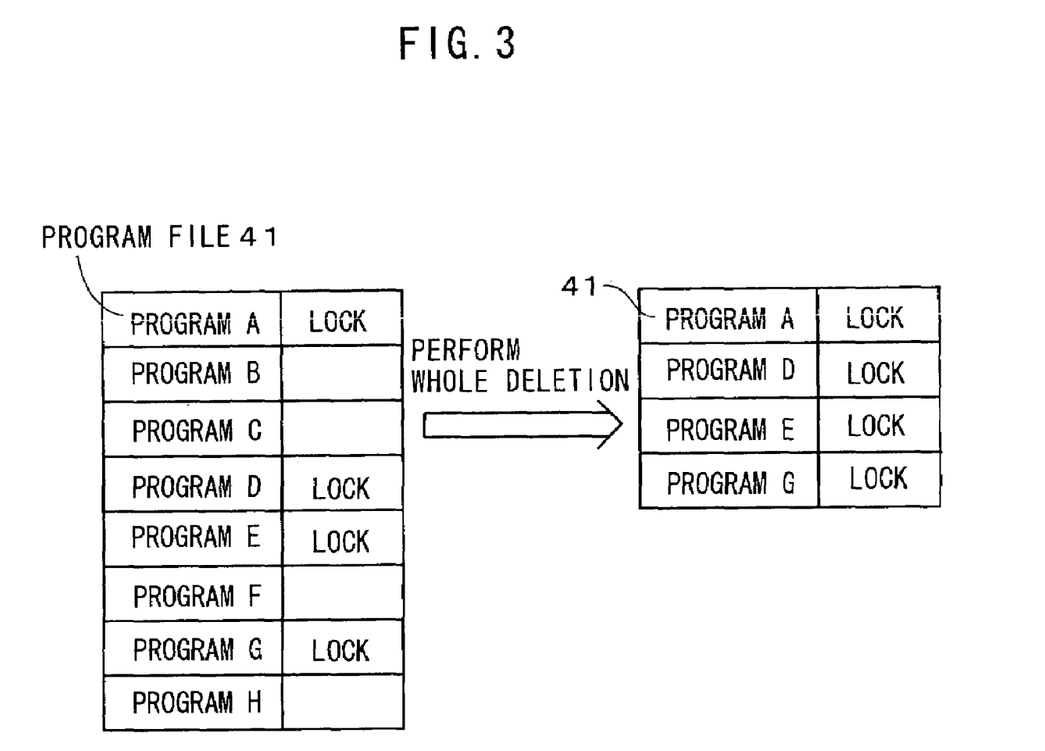
FIG. 3 is a chart showing a result of the processing for whole deletion.

Subsequently, processing in the STB 1 in the case where an instruction for the above-mentioned whole deletion is issued by the user using the remote control 20 will be described with reference to a flow chart of FIG. 2 and FIG. 3. When with the remote control 25 the user instructs lock processing of a program file which he/she intends to keep among the program files stored in the hard disk recorder 2 while checking a list of program names of the program files in the hard disk recorder 2, which is displayed on the display unit 10, the STB 1 transmits a lock command on the protocol of IEEE 1394 to hard disk recorder 2 through the bus 3. Thereby, the concerned program file stored in the hard disk recorder 2 goes into a locking state. For example, when the user instructs applying lock processing to program files of programs A, D, E and G stored in the hard disk recorder 2 one by one using the remote control 20, these program files go into a locking state. The left side of FIG. 3 shows the state of each of program files A to D in the hard disk recorder 2 at this time.

When the user instructs whole deletion in such state using the remote control 20, the microprocessor 7 on the side of the STB 1 receives data on the total number of the program files stored in the hard disk recorder 2 through the bus 3 (S1), sets the total number of the program files as an initial value of a program total number counter, and sets an initial value 1 to a specified program number as a number of the program file to be deleted at this time (S2). The specified program number is used as a pointer representing the position of the program file to be deleted. The microprocessor 7 transmits a deletion command with respect to the program file corresponding to the specified program number (S3) and subtracts 1 from the value of the program total number counter (S5) without changing the specified program number stored in the RAM 11 when the program file is successfully deleted (YES in S4). The reason why the specified program number is not changed is as follows: when the program file is successfully deleted, the specified program number before deletion of the program file indicates the position of the successive program file of the deleted program file, so that the specified program number need not be changed in the processing of sequentially transmitting the deletion command with respect to each program file stored in hard disk recorder 2.

When the program file is not successfully deleted in the determination processing of S4 (NO in S4), the microprocessor 7 determines that the program file concerned is locked (in a locking state), adds 1 to the specified program number stored in the RAM 11 to change the program file to be deleted (S6) and then subtracts 1 from the value of the program total number counter representing the total number of remaining program files to be deleted (S7). The processing of S3 to S7 is repeated until the value of the program total number counter becomes 0 (NO in S8). In the example shown in FIG. 3, by performing the above-mentioned processing, all of the program files 41 excluding program files of the programs A, D, E and G, which are in a locking state, among eight program files 41 of the programs A to H stored in the hard disk recorder 2 are automatically deleted in a short time period. When the number of the program files 41 to be deleted is large, a message "under deletion" may be displayed on the display unit 10.

As described above, according to the STB 1 of the first embodiment, when the user merely performs the simple operation of instructing deletion of all program files 41 stored in the hard disk recorder 2 by use of the remote control 20, the microprocessor 7 on the side of the STB 1 repeats the processing of transmitting the deletion command with respect to each program file to the hard disk recorder 2 until the value of the program total number counter becomes 0 irrespective of transmission of previous deletion commands. Thus, all unnecessary program files 41 in the hard disk recorder 2 can be deleted from the side of the STB 1 in a short time period with simple operation.

Figure 4:
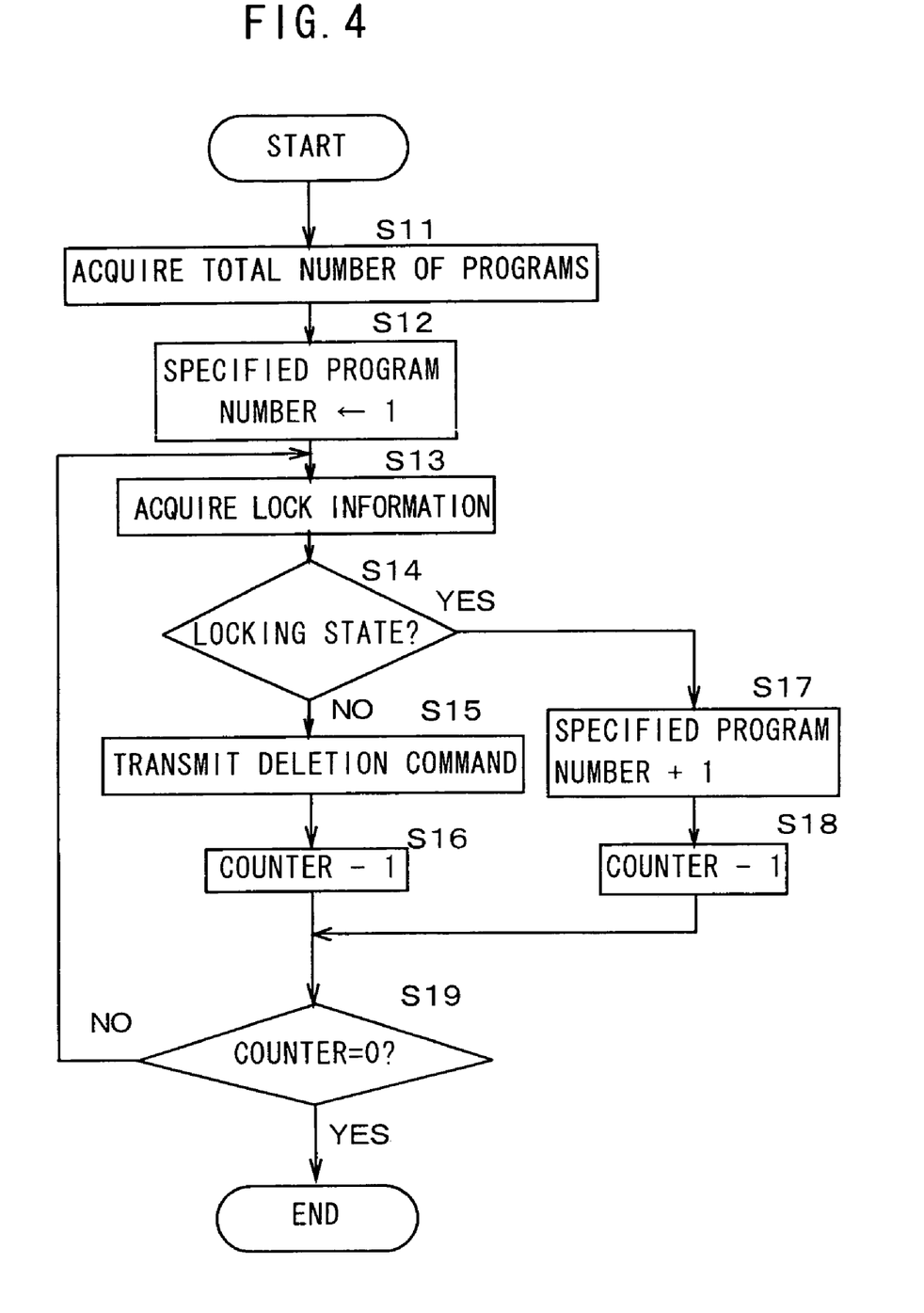
FIG. 4 is a flow chart showing processing in a STB according to a second embodiment of the present invention in the case where an instruction for whole deletion is issued.

Subsequently, processing in a STB 1 in accordance with a second embodiment will be described with reference to a flow chart of FIG. 4. The STB 1 of the second embodiment has a similar electric block configuration to that of the STB 1 of the first embodiment shown in FIG. 1. When the user instructs whole deletion using the remote control 20, the microprocessor 7 on the side of the STB 1 performs the same processing as S1 and S2 in the first embodiment (S11 and S12) and acquires data representing whether or not the program file 41 corresponding to the specified program number in the hard disk recorder 2 is in a locking state (lock information) from the hard disk recorder 2 through the bus 3 (S13). When the program file 41 concerned is not in a locking state (NO in S14), the microprocessor 7 of the STB 1 transmits the deletion command with respect to the program file 41 concerned (S15) and subtracts 1 from the value of the program total number counter (S16).

In the determination processing of S14, when the program file 41 concerned is in a locking state (YES in S14), the microprocessor 7 adds 1 to the specified program number stored in RAM 11 to change the program file to be deleted (S17) and subtracts 1 from the value of the program total number counter representing the total number of the remaining program files (S18). The processing of S13 to S18 is repeated until the value of the program total number counter becomes 0 (NO in S19).

As described above, according to the STB 1 of the second embodiment, when the user merely performs the simple operation of instructing deletion of all program files 41 stored in the hard disk recorder 2 by use of the remote control 20, the microprocessor 7 on the side of the STB 1 repeats the processing of transmitting the deletion command with respect to all program files 41 excluding the program file 41 in a locking state among the program files stored in the hard disk recorder 2. Thus, all unnecessary program files 41 in the hard disk recorder 2 can be deleted from the side of the STB 1 in a short time period with simple operation.

Figure 5:
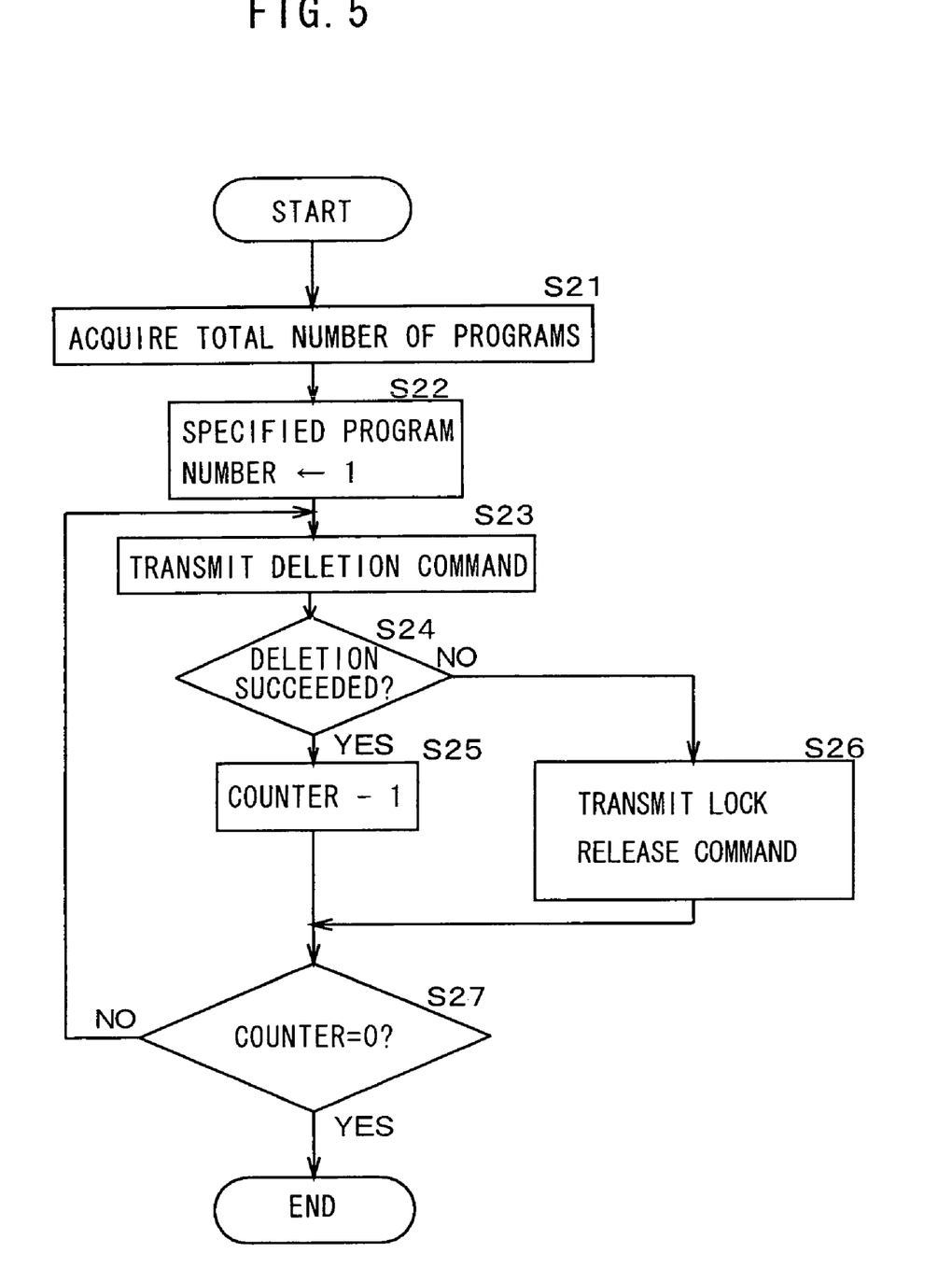
FIG. 5 is a flow chart showing processing in a STB according to a third embodiment of the present invention in the case where an instruction for whole deletion is issued.

Subsequently, processing in a STB 1 in accordance with a third embodiment will be described with reference to a flow chart of FIG. 5. In the first and second embodiments, when the user instructs whole deletion using the remote control 20, all program files 41 excluding the program file 41 in a locking state among the program files stored in the hard disk recorder 2 are deleted. On the other hand, in the third embodiment, all program files 41 including the program file 41 in a locking state among the program files 41 stored in the hard disk recorder 2 are deleted.

More particularly, when the user instructs whole deletion using the remote control 20, the microprocessor 7 on the side of the STB 1 performs the same processing as S1 and S2 in the first embodiment (S21 and S22), transmits the deletion command with respect to the program file 41 corresponding to the specified program number (S23) and when the program file is successfully deleted (YES in S24), subtracts 1 from the value of the program total number counter (S25).

When the program file is not successfully deleted in the determination processing of S24 (NO in S24), the microprocessor 7 determines that the program file concerned is locked (in a locking state), transmits a lock release command with respect to the program file concerned to the hard disk recorder 2 without changing the value of the program total number counter (S26) to release the locking state of the program file, and transmits the deletion command with respect to the program file again (S23). The processing of S23 to S26 is repeated until the value of the program total number counter becomes 0 (NO in S27). Since all unnecessary program files in the hard disk recorder 2 can be deleted from the side of the STB 1 in a short time period with simple operation in this manner, even when a manufacturer of the STB 1 is different from that of the hard disk recorder 2 and thus a format command transmitted from the STB 1 to the hard disk recorder 2 becomes invalid, the same effect can be obtained as in the case where an effective format command is transmitted from the STB 1 to the hard disk recorder 2. Furthermore, in the processing of whole deletion, when the number of the program files to be deleted is large and thus processing time for whole deletion becomes long, a message "under deletion" may be displayed on the display unit 10.

As mentioned above, according to the STB 1 of the third embodiment, when the user merely performs the simple operation of instructing deletion of all program files 41 stored in the hard disk recorder 2 by use of the remote control 20, the microprocessor 7 on the side of the STB 1 repeats the processing of transmitting the deletion command with respect to each program file to the hard disk recorder 2 until the value of the program total number counter becomes 0. For the program file not deleted, the microprocessor 7 transmits the lock release command with respect to the program file concerned to the hard disk recorder 2 to release the locking state of the program file, and transmits the deletion command with respect to the program file again. Thus, even when a manufacturer of the STB 1 is different from that of the hard disk recorder 2 and thus a format command of the hard disk 35 transmitted from the STB 1 to the hard disk recorder 2 becomes invalid, the same effect can be obtained as in the case where an effective format command is transmitted from the STB 1 to the hard disk recorder 2.

Figure 6:
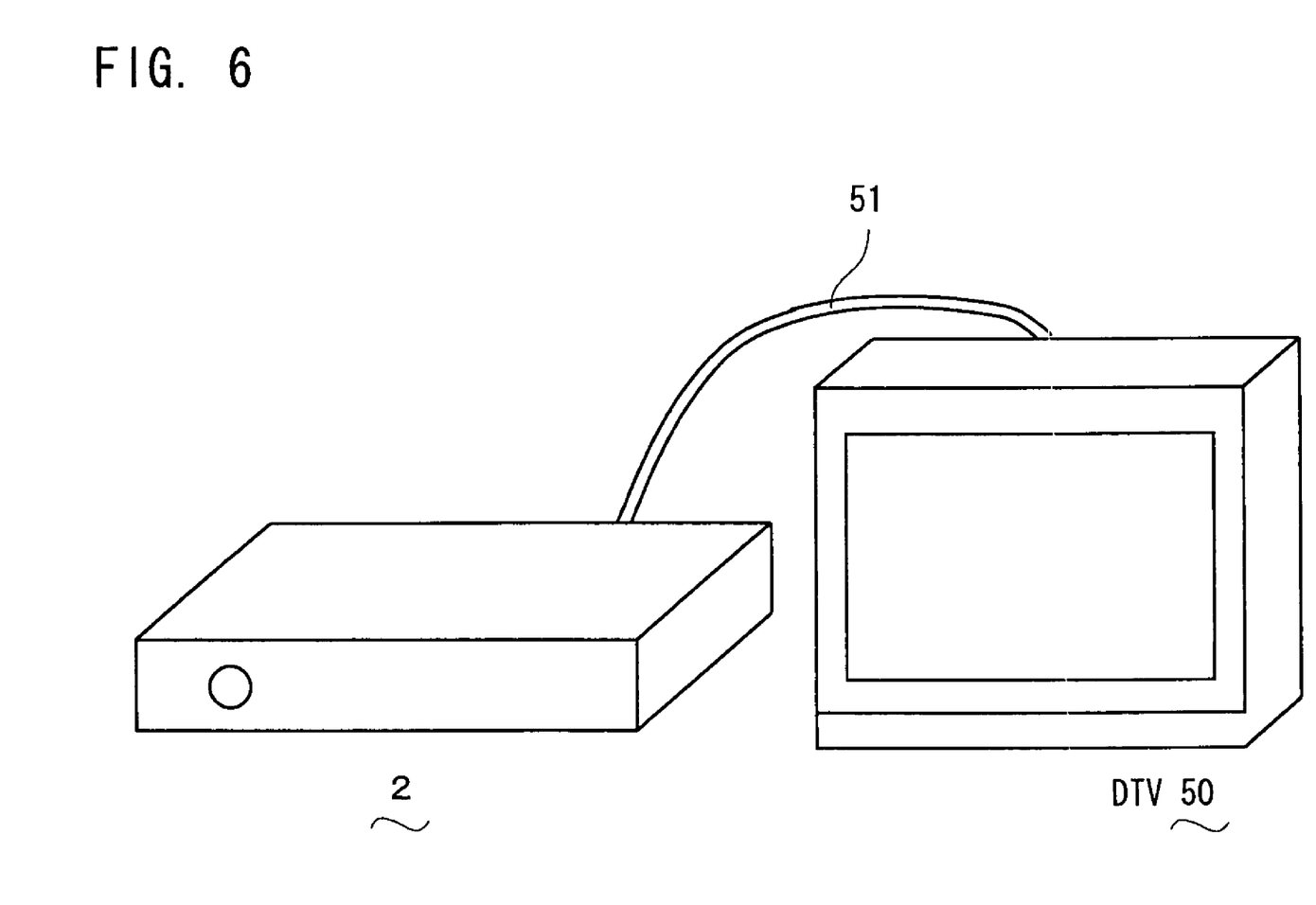
FIG. 6 is a perspective view showing a configuration example in the case where the present invention is applied to a digital television receiving set.

The present invention is not limited to the above-mentioned embodiments and various modifications can be made. For example, although each of the above-mentioned embodiments shows the case of applying the present invention to the STB 1, the present invention can be applied to other controller devices such as a digital television receiving set. FIG. 6 shows a configuration example in the case where the present invention is applied to a digital television receiving set (DTV) 50. In the configuration example, only the digital television receiving set 50 and the hard disk recorder 2 are connected to each other via an IEEE 1394 serial bus cable 51.

Furthermore, although the first embodiment shows the case of displaying the list of the program names of the program files stored in the hard disk recorder 2 on the display unit 10, the list of the program names may be displayed on the digital television receiving set on the bus.

Still furthermore, in the third embodiment, data on the total number of programs is firstly acquired from the hard disk recorder 2 and transmission of the deletion command with respect to each program file is repeated until the value of the program total number counter becomes 0. However, specific processing procedure of whole deletion is not limited to this. For example, the deletion command may be repeatedly transmitted until a return code included in a response from the hard disk recorder to the deletion command becomes a return code representing that no corresponding program file exists.

This application is based on Japanese patent application 2004-216445 filed Jul. 23, 2004 and Japanese patent application 2004-216442 filed Jul. 23, 2004, the contents of which are hereby incorporated by reference.

What is claimed is:

1. A controller device to be connected to a hard disk recorder capable of transmitting and receiving a control command through a serial bus comprising:

an operation means for issuing instructions for various operations to the controller device and the hard disk recorder including lock processing for preventing deletion of selected program file in the program files stored in the hard disk recorder and deletion processing of all program files stored in the hard disk recorder;

an interface for transmitting/receiving the control command, its response signal and stream data to/from the hard disk recorder; and a microprocessor for controlling the processing of deleting all program files in the hard disk recorder, wherein when the user instructs the deletion processing of all program files using the operation means, the microprocessor repeats transmission of a deletion command with respect to all program files stored in the hard disk recorder to the hard disk recorder and deletes all program files excluding the program file subjected to the lock processing among all program files stored in the hard disk recorder.

2. An controller device to be connected to the serial bus as stated in claim 1, which is a set-top box.

3. An controller device to be connected to the serial bus as stated in claim 1, which is a digital television receiving set.

4. A controller device to be connected to a hard disk recorder capable of transmitting and receiving a control command through a serial bus comprising:
   an operation means for issuing instructions for various operations to the controller device and the hard disk recorder including lock processing for preventing deletion of selected program file in the program files stored in the hard disk recorder and deletion processing of all program files stored in the hard disk recorder;
   an interface for transmitting/receiving the control command, its response signal and stream data to/from the hard disk recorder; and
   a microprocessor for controlling the processing of deleting all program files in the hard disk recorder, wherein
   when the user instructs the deletion processing of all program files using the operation means,
   the microprocessor repeats transmission of a deletion command with respect to all program files excluding the program file in a locking state among the program files stored in the hard disk recorder.

5. An controller device to be connected to the serial bus as stated in claim 4, which is a set-top box.

6. An controller device to be connected to the serial bus as stated in claim 4, which is a digital television receiving set.

7. A controller device to be connected to a hard disk recorder capable of transmitting and receiving a control command through a serial bus comprising:
   an operation means for issuing instructions for various operations to the controller device and the hard disk recorder including lock processing for preventing deletion of selected program file in the program files stored in the hard disk recorder and deletion processing of all program files stored in the hard disk recorder;
   an interface for transmitting/receiving the control command, its response signal and stream data to/from the hard disk recorder; and
   a microprocessor for controlling the deletion processing of all program files in the hard disk recorder, wherein
   when the user instructs the processing of deleting all program files using the operation means,
   the microprocessor repeats transmission of a deletion command with respect to all program files stored in the hard disk recorder to the hard disk recorder, for the program file not deleted, transmits a lock release command with respect to the program file concerned to the hard disk recorder to release lock state of the program file and transmits the deletion command with respect to the program file again.

8. An controller device to be connected to the serial bus as stated in claim 7, which is a set-top box.

9. An controller device to be connected to the serial bus as stated in claim 7, which is a digital television receiving set.

10. A controller device to be connected to a hard disk recorder capable of transmitting and receiving a control command through a serial bus comprising:
    an operation means for issuing instructions for various operations to the controller device and the hard disk recorder including lock processing for preventing deletion of selected program file in the program files stored in the hard disk recorder and deletion processing of all program files stored in the hard disk recorder;
    an interface for transmitting/receiving the control command, its response signal and stream data to/from the hard disk recorder;
    a control means for controlling the processing of deleting all program files in the hard disk recorder;
    a program total number acquisition means for finding the number of program files stored in the hard disk recorder on the basis of data received from the hard disk recorder through the interface;
    a program total number counter for setting the total number of the program files found by the program total number acquisition means as an initial value;
    a decrement means for subtracting 1 from a value of the program total number counter;
    a specified program number storage means for storing a specified program number as a number of the program file to be deleted at the time among the program files stored in the hard disk recorder; and
    a determination means for determining whether or not the program file concerned is successfully deleted on the basis of a return code to the deletion command with respect to each program file, wherein
    when the user instructs the deletion processing of all program files stored in the hard disk recorder using the operation means,
    the control means performs the deletion processing comprising:
    repeating transmission of the deletion command with respect to each program file to the hard disk recorder until the value of the program total number counter becomes 0 and performs determination by the determination means each transmission of the deletion command;
    subtracting 1 from the value of the program total number counter by the decrement means when the determination means determines that the program file concerned is successfully deleted; and
    adding 1 to the specified program number stored in the specified program number storage means to change the program file to be deleted and then subtracts 1 from the value of the program total number counter by the decrement means when the determination means determines that the program file concerned is not successfully deleted.

11. An controller device to be connected to the serial bus as stated in claim 10, which is a set-top box.

12. An controller device to be connected to the serial bus as stated in claim 10, which is a digital television receiving set.

13. A controller device to be connected to a hard disk recorder capable of transmitting and receiving a control command through a serial bus comprising:
    an operation means for issuing instructions for various operations to the controller device and the hard disk recorder including lock processing for preventing deletion of selected program file in the program files stored in the hard disk recorder and deletion processing of all program files stored in the hard disk recorder;
    an interface for transmitting/receiving the control command, its response signal and stream data to/from the hard disk recorder;
    a control means for controlling the processing of deleting all program files in the hard disk recorder;

a program total number acquisition means for finding the number of program files stored in the hard disk recorder on the basis of data received from the hard disk recorder through the interface;

a program total number counter for setting the total number of the program files found by the program total number acquisition means as an initial value;

a decrement means for subtracting 1 from a value of the program total number counter; and a determination means for determining whether or not the program file concerned is successfully deleted on the basis of a return code to the deletion command with respect to each program file stored in the hard disk recorder, wherein when the user instructs deletion of all program files stored in the hard disk recorder using the operation means, the control means performs the deletion processing comprising:

repeating transmission of the deletion command with respect to each program file to the hard disk recorder until the value of the program total number counter becomes 0 and performs determination by the determination means each transmission of the deletion command;

subtracting 1 from the value of the program total number counter by the decrement means when the determination means determines that the program file concerned is successfully deleted; and transmitting a lock release command with respect to the program file concerned to the hard disk recorder to release lock state of the program file without changing the value of the program total number counter and transmits the deletion command with respect to the program file again when the determination means determines that the program file concerned is not successfully deleted.

14. An controller device to be connected to the serial bus as stated in claim 13, which is a set-top box.

15. An controller device to be connected to the serial bus as stated in claim 13, which is a digital television receiving set.

16. A method of controlling a hard disk recorder by a controller device, comprising:

receiving, by the controller device from a remote controller device, a lock processing command to prevent deletion of selected program files stored in the hard disk recorder;

receiving, by the controller device from a remote controller device, a single deletion command;

transmitting, by the controller device to the hard disk recorder, an indication of the selected program files subject to the lock processing command; and transmitting, by the controller device to the hard disk recorder in response to the single deletion command, a number of deletion commands corresponding to a number of all of the program files stored in the hard disk recorder, wherein all program files stored on the hard disk recorder are deleted except for the selected program files subject to the lock processing command.

17. The method of claim 16, comprising:

determining, by the controller device, a total number of program files stored in the hard disk recorder;

determining, by the controller device based on a return code received in response to one of the transmitted deletion commands, whether the program file to be deleted was successfully deleted;

subtracting 1 from the total number of program files after receiving the return code;

adding 1 to a specified program number to be deleted when the a program file is not successfully deleted.

18. A method of controlling a hard disk recorder by a controller device, comprising:

receiving, by the controller device from a remote controller device, a lock processing command to prevent deletion of selected program files stored in the hard disk recorder;

receiving, by the controller device from a remote controller device, a single deletion command;

transmitting, by the controller device to the hard disk recorder, an indication of the selected program files subject to the lock processing command; and transmitting, by the controller device to the hard disk recorder in response to the single deletion command, a number of deletion commands corresponding to a number of all of the program files stored in the hard disk recorder except for the program files subject to the lock processing command.

* * * * *